Oct. 7, 1958 R. B. NAWMAN 2,854,784

HANGER FOR TELEPHONE DIRECTORIES

Filed Jan. 25, 1957 2 Sheets-Sheet 1

INVENTOR.
ROLLIE B. NAWMAN
BY Flehr & Swain
ATTORNEYS

Oct. 7, 1958 R. B. NAWMAN 2,854,784

HANGER FOR TELEPHONE DIRECTORIES

Filed Jan. 25, 1957

2 Sheets-Sheet 2

INVENTOR.
ROLLIE B. NAWMAN

BY Fleh & Swain

ATTORNEYS 2,854,784

HANGER FOR TELEPHONE DIRECTORIES

Rollie B. Nawman, Oakland, Calif.

Application January 25, 1957, Serial No. 636,362

8 Claims. (Cl. 45—58)

This invention relates to directory hangers and particularly to devices which are adapted to provide a support for telephone directories and similar volumes.

As is well known, directories of this type must be available to the general public and must be available particularly in telephone booths, hallways and other places which are restricted in size. It has been found that when telephone directories are positioned in telephone booths, for example, that they must be secured against removal and yet they must be secured in such a manner that they may be freely moved about within a limited area. It has been the usual practice to provide a shelf, for example, upon which the directory may be laid and by which it may be supported while a patron is using the same. However, it is desirable that after the patron has used the book that it be returned to a predetermined storage position. This is particularly so when two or more directories are to be hung in a closely confined area so that the patrons can not pile books one on top of the other and damage the books.

It is an object of this invention to provide a hanger which is adapted to support at least two directories.

It is a further object of this invention to provide such a hanger which will maintain the books in closed and out of the way position when they are not in use.

It is a further object of this invention to provide a hanger which is adapted to support the book when the patron is using it and which will automatically return the directory to storage position when the patron has concluded his use of the directory.

Figures 1, 2:
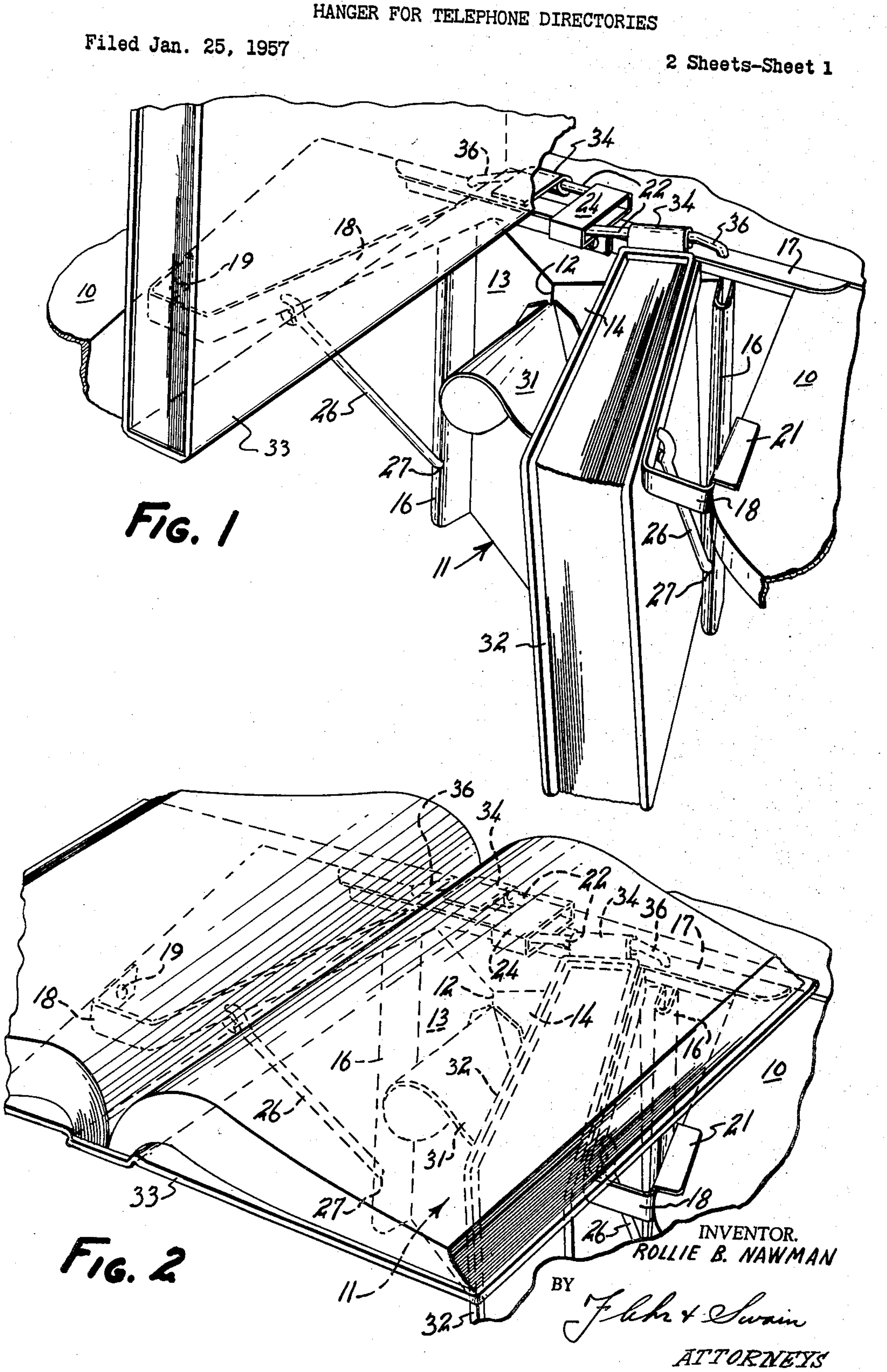
Figure 3:
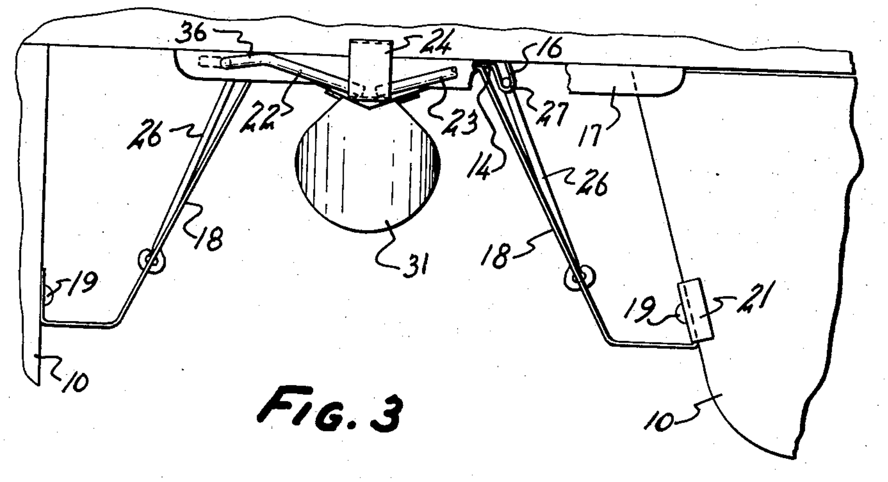
Figure 4:
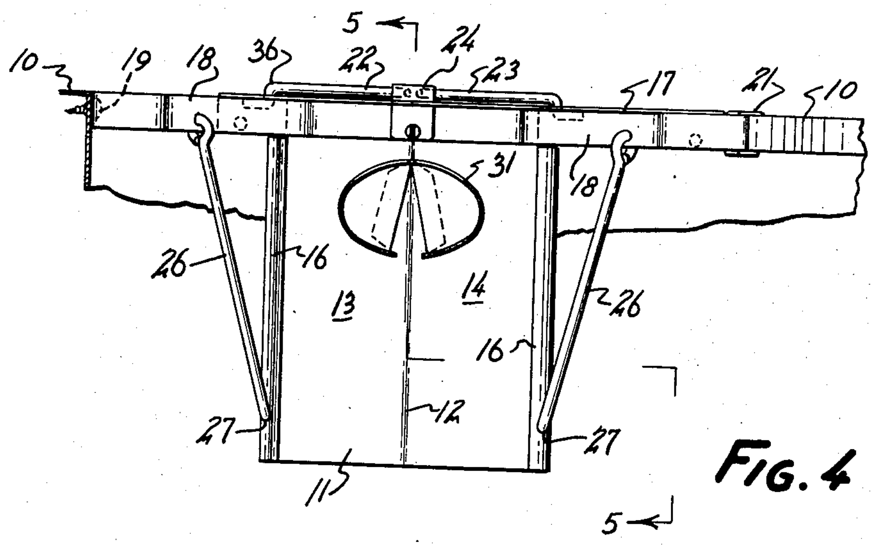
Figure 5:
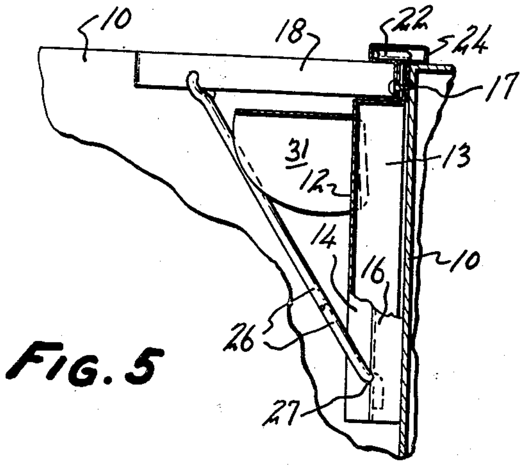

These and other objects and advantages of the invention will appear from the following specification taken in conjunction with the accompanying drawing in which:

Figure 1 illustrates a perspective view of my hanger showing a book in stored position and a second book in unopened yet about to be used position, Figure 2 is a view of the hanger illustrated in Figure 1 with the directory in usable position, Figure 3 is a top view of my directory hanger, Figure 4 is a front view of my directory hanger, and Figure 5 is a cross-sectional view taken along the line 5—5 of Figure 4 illustrating particular features of my directory hanger.

As illustrated in the drawings my directory hanger is adapted to be used either along one vertical flat wall surface of a telephone booth or other restricted area in which it is customary to provide directories. As is illustrated in the drawings my device may be inserted in an opening in a shelf 10 for example or, as will be made clear from the further description herein, it may simply project outwardly from one wall of a telephone booth. Generally speaking, and as illustrated in Figures 1 and 4, my device consists of a back rest portion 11 which is generally vertical but which is bent at 12 to provide a pair of back rest portions 13 and 14 which are inclined at an angle with respect to each other as indicated. The side edges of the back rest 11 are bent to form channel sections 16 which lend strength to the entire assembly.

The entire assembly is particularly adapted to be supported by an angle bracket 17 which may be secured to the telephone booth or other wall in any suitable manner and to which the back rest portion 11 is likewise secured in any suitable manner. Extending outwardly from the angle bracket 17 I have provided a pair of substantially identical side guides 18 whose general vertical planes are at approximately right angles to the planes of the back rest portions 13 and 14 with which they are associated. The side guides 18 may be secured to the edges of the opening in the shelf 10 in any suitable manner as for example by means of screws 19 or a clamp assembly of the type illustrated at 21. The angle bracket 17 also supports a pair of identical book or directory mounting bars 22 which are pivotally mounted on the bracket 17 in any suitable manner, but as is illustrated in the drawings, they are simply bent and adapted to be received by holes in the upper wall of the angle bracket 17. The free and adjacent ends of the directory mounting bars 22 and 23 are adapted to lie under a mounting bar lock member 24 which consists generally of a hollow housing within which the bars 22 and 23 are free to move laterally but which is sufficiently wide that the bars 22 and 23 may not be removed therefrom. Thus it is apparent that the directory mounting bars are free to swing about their pivotal mountings in the angle bracket 17 but that their swinging movement is limited by the member 24 so that they may not swing free without removing the lock member 24. A pair of side guide support members 26 are also provided which serve to lend rigidity to the whole device. The construction of these elements is not critical but the construction which I have illustrated possesses certain advantages. For example it will be noted that the members 26 are pivotally connected to the side guides 18 and the other ends rest in holes 27 in the members 16. With the ends of the members 26 bent in the manner indicated, once the device has been assembled the members 26 cannot be removed from the members 16.

I provide a curved divider 31 which is secured to the back wall member 16 generally as shown. The divider 31 is flared downwardly generally as illustrated in the drawings and the distance between the member 31 at the point at which it most nearly approaches the side wall brackets 18 is generally substantially identical to the width of a directory or book which is to be supported by my device. The full purpose of the divider 31 will more fully hereinafter be explained.

A pair of directories 32 and 33 are provided with a rearwardly turned portion 34 which forms a gudgeon and which is adapted to be pivotally mounted upon the book mounting bars 22 and 23 which in effect form pintles. The mounting bars 22 and 23 and the gudgeon 34 form a hinge about which the book 32 or 33 may be pivoted as indicated generally in Figure 1. It should be pointed out that the pintles or book mounting bars 22 and 23 are provided with an offset 36 as indicated generally in Figure 2 so that the gudgeon 34 may be slid only to a predetermined point, that is the offset point 36, on each of them. As will more fully hereinafter be pointed out this prevents binding. The offset is generally in the plane of the side guide 18. Thus it is apparent that the directory 32 or 33 is adapted to be swung vertically about the axis of the directory mounting bars 22 and 23 to the position illustrated by the directory 33 in Figure 1. The directory may then be opened. It will be noted that the width of the open directory exceeds the distance between the side guides 18 with the result that when the book is positioned as illustrated in Figure 2 a plane is defined by the side walls 18 and the gudgeon 34. As long as the patron keeps his band on one of the side edges of the directory beyond the side guides 18 the book will be retained in the position illustrated in Figure 2. Immediately however that the patron releases the directory or removes the weight from the same the directory will swing downwardly about the axis of the book mounting bar 22 or 23. One of its edges will engage one of the side guides 18 and the other of its edges will engage one of the side walls of the divider 31 with the result that the sides of the books will be urged together and the book will then occupy the position indicated by the directory 32 in Figure 1.

Thus it will be apparent that a directory will be retained in a closed out of the way position when it is released and not in use. However, it will be equally apparent that the directory may be moved to a position of use simply by causing the same to be pivoted about its particular directory mounting bar 22 or 23 and opened to a desired position in such a manner that it will overlie the side guides 18 and be supported by the gudgeon 34 and the patron. Experiments have indicated that substantially no weight or effort is required to retain a directory in the position illustrated in Figure 2. In the open position as illustrated in Figure 2, the pages may be turned without losing the directory or permitting the same to fall between the members 18 and 31. However, once the information which has been desired has been selected, then simply by releasing his hold upon the directory the patron will permit the same to fall downwardly about the bar 21, 22 or 23 into closed out-of-the-way inoperative position as illustrated in Figure 1.

The fact that the distance between the divider 31 and the vertical plane defined by the side guides 18 is substantially identical to the width of the directory results in the directory being kept in closed position with the result that its leaves are not blown and they do not become dirty, crumpled, or folded. Moreover, only one directory at a time can be used with the result that directories do not become piled one on top of the other. It will also be noted that the back wall portions 13 and 14 of the member 11 are at substantially right angles to the plane of the side guides 18. Thus the backs of the directories are supported throughout substantially their entire length and the tendency for the back to curl or become cracked is reduced.

Because of the offset 36 the gudgeon 34 cannot be moved beyond the plane of the side wall with which the directory is associated and thus there is no tendency of the directory to bind on its downward swing. The pivotal mounting of the directory mounting bars 22 and 23 permits the book to be moved within a limited area and yet, when the guide 22 is swung to the position illustrated in either Figure 1 or 2 the directory which it supports will be free to fall to a position similar to that occupied by the directory 32 in Figure 1 and the directory mounting bar will swing freely to the position which it must occupy if the book is to occupy the storage position illustrated by the directory 32.

It will be apparent from the foregoing that I have provided a simple type of directory hanger in which a pair of directories may be hung in such a manner that they may be readily used and yet, when not in use, they are stored in the most satisfactory manner; that is in an out-of-the-way and yet protected position.

I claim:

1. In a hanger for telephone directories, a substantially horizontal shelf having an opening therein between the ends thereof, a pair of telephone directories, means for pivotally suspending the upper rear portion of each of said directories upon the portion of the shelf defining the rear of said opening, the opening having a width substantially greater than the width of the pair of directories, the pivotal connections permitting movement of said directories from normal out-of-the-way positions to positions permitting use of the directories, each of the directories when being moved from an out-of-the-way position to an in-use position being swung about its pivotal connection to bring the directory to be used above the opening in the shelf to permit opening and use of the directory, the directory when in use being adapted to be held in an open position upon the shelf by holding at least one side of the directory upon the shelf, the open directory when released dropping by its own weight from the shelf, and means for causing the dropping directory to return to its normal out-of-the-way position.

2. A hanger for telephone directories as in claim 1 together with a substantially vertical back-rest for said directories to maintain said directories in a substantially vertical position when said directories are in an out-of-the-way position, said back-rest being mounted below said shelf and being formed in two portions, the portions being inclined with respect to each other to cause said directories to be inclined away from each other, and wherein the pivotal connections for the directories are mounted to accommodate the inclining of the directories by the back-rest portions.

3. A hanger for telephone directories as in claim 2 wherein said means causing the dropping directories to return to their normal out-of-the-way positions comprises a downwardly curved deflecting member mounted on said back-rest below said shelf.

4. A hanger for telephone directories as in claim 1 wherein said means for pivotally suspending the upper rear portion of each of said directories consists of a pintle-like member having one end pivotally mounted in said shelf, a detachable member mounted on said shelf and having a horizontal slot therein, the free end of said pintle-like member extending into said slot, the slot permitting limited swinging movement of the pintle-like member in a substantially horizontal plane, and a gudgeon secured to the directory and slidably and pivotally mounted on said pintle-like member.

5. A hanger for telephone directories as in claim 4 wherein the same detachable member having a slot therein is utilized for restraining movement of the free ends of the pintle-like members for both directories.

6. In a hanger for telephone directories, a substantially horizontal shelf having an opening therein, a pair of telephone directories, the opening having a width substantially greater than the width of the pair of directories, a pair of pintle-like members, one end of each of said pintle-like members being pivotally mounted in said shelf, a detachable member mounted on said shelf and having a horizontal slot therein, the free ends of both of the pintle-like members extending into said slot, the slot permitting limited movement of the pintle-like members in a substantially horizontal plane, gudgeons slidably and pivotally mounted on said pintle-like members and secured to the upper rear portions of said directories to suspend the directories from the pintle-like members, the pintle-like members and the gudgeons forming pivotal connections permitting pivotal movement of said directories from normal out-of-the-way positions to positions permitting use of the directories, each of the directories when being swung from an out-of-the-way position to an in-use position being swung about the pivotal connections to bring the same above the opening in the shelf whereby the directory may be opened and used, the directory when in use being adapted to be held in an open position by placing the open directory upon the shelf and holding at least one side of the directory upon the shelf, the open directory when released dropping by its own weight from the shelf, and means mounted below the shelf for causing the dropping directory to return to its normal out-of-the-way position.

7. A hanger for telephone directories as in claim 6 together with a substantially vertical back-rest for said directories to maintain said directories in a substantially vertical position when the directories are in an out-of-the-way postion, the back-rest being mounted below said shelf and being formed in two portions, the portions being inclined with respect to each other to cause said directories to be inclined away from each other when they are in out-of-the-way positions and wherein the pivotal connections for the directories are mounted to accommodate the inclining of the directories by the back-rest portions.

8. A hanger for telephone directories as in claim 6 wherein said means mounted below the shelf for causing the dropping directory to return to its normal out-of-the-way position consists of a downwardly curved outwardly flared deflecting member mounted on the back-rest below the shelf between the two directories when the directories are in out-of-the-way positions.

References Cited in the file of this patent

UNITED STATES PATENTS

| | | |
|---|---|---|
| 1,053,862 | Paterson | Feb. 18, 1913 |
| 1,238,899 | Enen | Sept. 4, 1917 |
| 1,796,496 | Volkmar | Mar. 17, 1931 |
| 1,910,207 | Freeman | May 23, 1933 |
| 1,980,650 | Webber | Nov. 13, 1934 |
| 2,439,950 | Roger | Apr. 20, 1948 |

FOREIGN PATENTS

| | | |
|---|---|---|
| 36,321 | Netherlands | Nov. 26, 1931 |